May 13, 1947.  S. DE WALT  2,420,468
SAW TOOTH GAGE AND JOINTER
Filed June 15, 1945   2 Sheets—Sheet 1
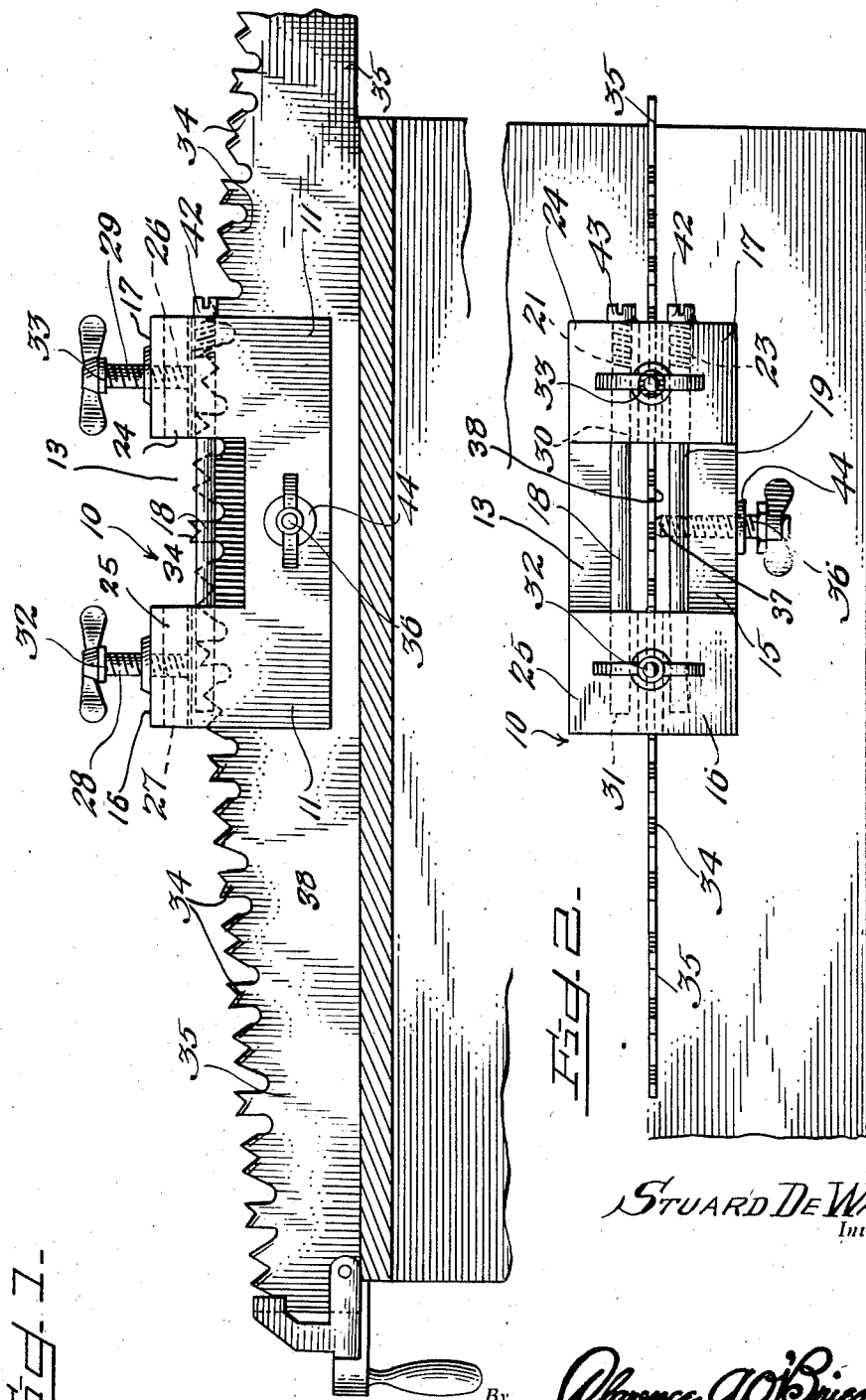
Stuard DeWalt
Inventor

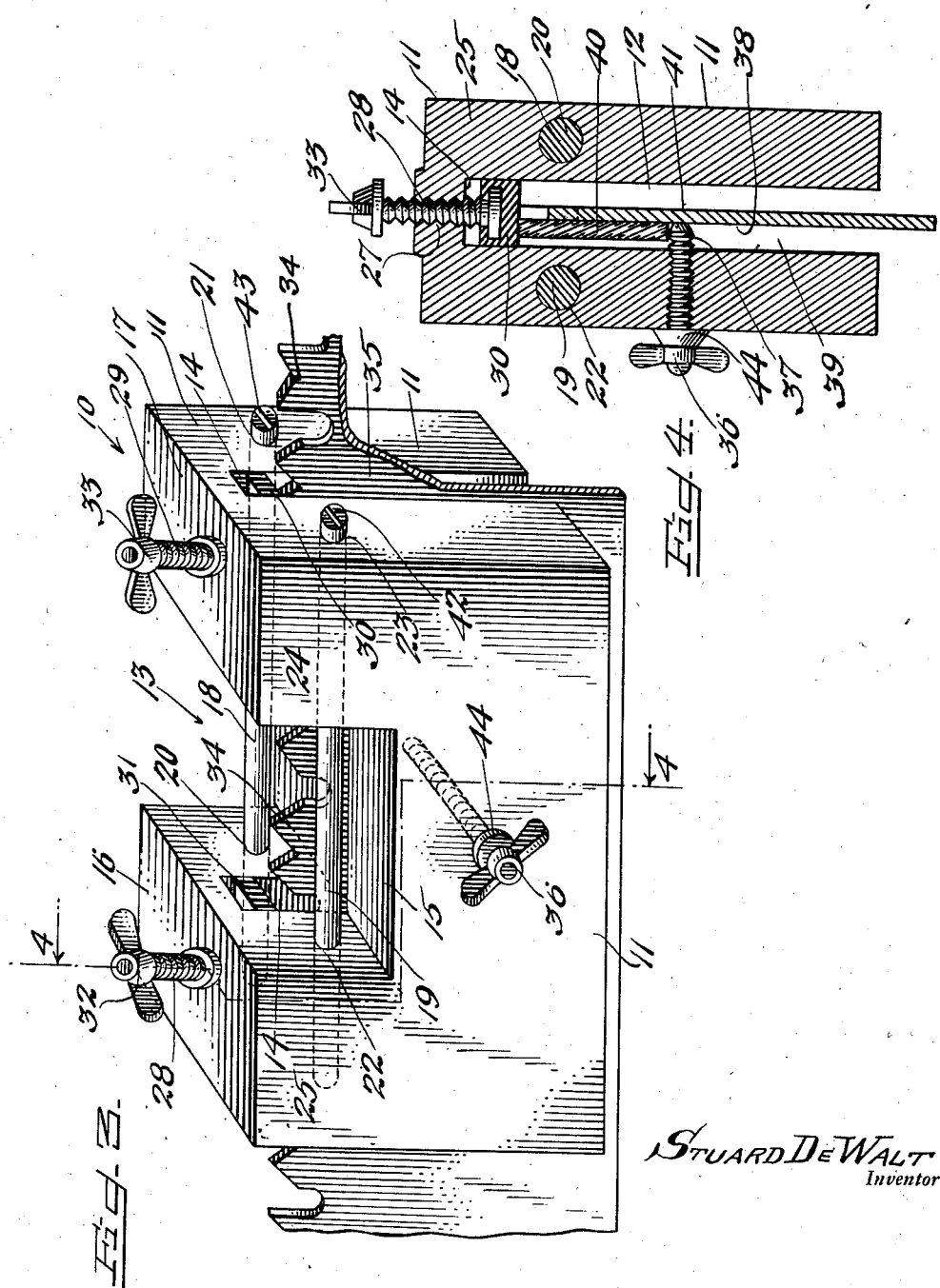

Patented May 13, 1947

2,420,468

UNITED STATES PATENT OFFICE 2,420,468

SAW-TOOTH GAGE AND JOINTER

Stuard De Walt, Leavenworth, Kans.

Application June 15, 1945, Serial No. 599,659

6 Claims. (Cl. 76—46)

This invention relates to a saw filing device and has for its object to provide a combination rake tooth gage and jointer of very effective and simple construction and so accurate that it may be used as successfully by a novice as one versed in the art of saw filing.

Another object of the invention is to provide in a saw tooth gage rollers over which a file may ride in cutting down to a proper level.

A still further object of the invention is to provide a gage block having a longitudinal kerf within which a saw blade and file may be held in jointing the saw teeth.

A further and primary object of the invention is to provide gage for saw rake teeth having means whereby when the teeth are reduced to the proper gage the file will cease action even though its movement is continued and without injury to the file or gage.

Other features and advantages will become more readily apparent from the following description and the accompanying illustrative drawings in which:

Figure 1 is an elevational view of my device as applied to a saw blade,

Figure 2 is a top plan view thereof,

Figure 3 is an enlarged perspective view of my invention, and

Figure 4 is a sectional view taken on line 4—4 of Figure 3.

In the drawings and specification like reference characters indicate like parts throughout and in which 10, indicates a combined adjustable crosscut saw, rake tooth gage and jointer. The invention consists of a block 11, of suitable dimensions midway of the width of which is provided a longitudinal kerf 12 extending up from the bottom. A transverse cut-out 13, of suitable width is provided in the upper center of the body 11, which cut-out extends down below the upper terminal 14, of said kerf 12, and between the bottom wall 15, of the cut-out and the upper wall surfaces 16 and 17, are rotatably mounted case hardened rollers 18 and 19, on the opposite sides of the kerf. These rollers are in the form of circular pins mounted to turn in bores 20 and 21 and 22 and 23, respectively, extending entirely through the upstanding ends 24 and partly through ends 25, of said body to form end walls closing the outer ends of bores 20 and 22 to abut the adjacent ends of the rollers.

Threaded vertical bores 26 and 27, project through the walls 16 and 17, to receive screws 28 and 29, directly over said kerf, which screws carry on their inner ends gage blocks or bars 30 and 31. The screws 28 and 29, are provided on their outer terminals with wings 32 and 33, whereby they may be manually adjusted to provide a gage for the rake teeth 34, of a saw 35.

Threaded through the block 11, centrally thereof and below the wall or surface 15 and at a proper distance therebelow is a threaded pin or screw 36, of sufficient length to permit its end 37, to reach the surface 38, of saw 35. Said end 37, projecting through one side 39, of the kerf 12, forms a support for a jointer file 40. In order to joint the other side 41, of the saw, the block 11, is reversed on the saw. The rollers 18 and 19, are retained or held in place by screws 42 and 43, threaded into the outer ends of said bores 21 and 23. A stop collar 44 is provided on screw 36 to limit it in movement.

From the foregoing it will be apparent that I have designed a gage and jointer combination which while very efficient in accuracy, inexpensive in cost and simple in use, yet so constructed that the gaging and jointing of saw teeth even by a novice may be done without danger of harm either to the saw teeth, the file being used, or to the gage itself, for when the raker teeth are reduced to a proper line or plane with the gage rollers, the file, even if its movement is continued, will simply rotate the rollers without further touching the saw teeth, cutting into the rollers or in any manner damaging the file.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

1. The described device comprising a block having a longitudinal kerf and an intermediate cut out, a pair of vertically slidable blocks in the kerf beyond each side of the cut out, rollers crossing the cut out and having their ends bearing with in the walls of the blocks, means extending through the opposite upper walls of the block for adjusting said slidable blocks, a screw threaded through a wall of the block at one side of the kerf intermediate of the cut out and below the same to extend into the kerf, and supporting a file on the edge projecting through the kerf.

2. The described device comprising a block having a longitudinal kerf and an intermediate cut out, a pair of vertically slidable blocks in the kerf beyond each side of the cut out, rollers crossing the cut out and having their ends bearing within the walls of the block, means extending through the opposite upper wall of the block for adjusting said slidable blocks, and a screw threaded through the block at one side of the kerf intermediate of the cut out and below the same to extend into the kerf.

3. The described device comprising a block having a longitudinal kerf and an intermediate cut out, a pair of vertically slidable blocks in the kerf beyond each side of the cut out, rollers crossing the cut out and having their ends bearing within the walls of the block, and means extending through the opposite upper walls of the block for adjusting said slidable blocks.

4. The described device comprising a block having a longitudinal kerf and an intermediate cut out, a pair of vertically slidable blocks in the kerf beyond each side of the cut out, and rollers crossing the cut out and having their ends bearing within the walls of the block.

5. A combined saw tooth gage and jointer comprising a block having a longitudinal kerf extending therethrough from the bottom, a transverse cut-out in the top of the block depending below the top of the kerf, means within the kerf at each side of the cut-out for gaging the projection of saw teeth into the cut-out, longitudinal rollers on each side of the kerf at the cut-out for supporting a file for engagement with said teeth, said rollers adapted to limit the down movement of the file, said block having longitudinal bores intersecting the cut-out on each side of the kerf, and between the top of the kerf and the bottom of the cut-out, said bores terminating short of one end of the block, with the rollers mounted in the bores, means at the other ends of the bores to retain the rollers in position, and adjustable means extending through the block at one side of the kerf for supporting a jointer file against the side of the saw in the kerf.

6. A combined saw tooth gage and jointer comprising a block having a longitudinal kerf extending therethrough from the bottom, a transverse cut-out in the top of the block below the top of the kerf, gage bars within the kerf at each side of the cut-out for gaging the projection of saw teeth into the cut-out, screws threaded through the block above the kerf at each side of the cut-out and swiveled to the gage bars, said block having longitudinal bores extending from one end and intersecting the cut-out on opposite sides of the kerf and terminating short of one end of the block, rollers mounted in said bores, screws in the opposite ends of the bores to hold said rollers in position and a screw threaded through the block at one side of the kerf below the cut-out to support a jointer file against the sides of the saw.

STUARD DE WALT.

REFERENCES CITED

The following references are of record in the file of this patent:

UNITED STATES PATENTS

| Number | Name | Date |
| --- | --- | --- |
| 2,339,509 | Olson | Jan. 18, 1944 |
| 286,348 | Torrence et al. | Oct. 9, 1883 |
| 580,508 | Richardson et al. | Apr. 13, 1897 |
| 864,907 | Murback | Sept. 3, 1907 |
| 1,003,904 | Higbee | Sept. 19, 1911 |
| 1,009,613 | Woolf | Nov. 21, 1911 |